United States Patent [19]

Ekinci

[11] Patent Number: 5,358,442
[45] Date of Patent: Oct. 25, 1994

[54] AIR INTAKE DEVICE FOR LAND VEHICLES

[76] Inventor: Mehmet M. Ekinci, 400 E. 57th St., #4H, New York, N.Y. 10022

[21] Appl. No.: 18,502

[22] Filed: Apr. 16, 1993

[51] Int. Cl.$^5$ .............................................. B60H 3/06
[52] U.S. Cl. .................................. 454/158; 55/385.3; 454/2; 454/143
[58] Field of Search ..................... 454/2, 10, 143, 158, 454/338; 55/385.3, 517

[56] References Cited

U.S. PATENT DOCUMENTS

| | | | |
|---|---|---|---|
| 663,173 | 12/1900 | Huy | 454/2 X |
| 3,738,088 | 6/1973 | Colosimo | 55/385.3 X |
| 3,844,202 | 10/1974 | Ferguson | 454/158 X |
| 4,558,636 | 12/1985 | Malmstrom et al. | 454/158 X |
| 5,086,858 | 2/1992 | Mizuta et al. | 55/385.3 X |

FOREIGN PATENT DOCUMENTS 2648572  5/1978  Fed. Rep. of Germany ...... 454/158

*Primary Examiner*—Harold Joyce
*Attorney, Agent, or Firm*—Steinberg Raskin & Davidson

[57] ABSTRACT

A telescopic double wall air intake device having an antenna including an air intake canister attached to one end of the antenna and an air plenum arranged on the other end of the antenna. The air canister has disposable filtering material therein. The air plenum is attached to a frame of a car or other vehicle and carries the pneumatic or electric motor for moving the telescopic air intake device up and down. The air plenum may also be connected to a radio and other communication devices. The inlet side of a high static air moving device, e.g., an air booster fan, is connected to the air plenum via a flexible duct. The discharge side of the booster fan is connected to a second air plenum, e.g., an air mixing plenum, via a flexible metal air duct. The air mixing plenum has three connection ports, two of which are used for inlet flows and one of which is for discharge flow. The inlet ports are provided with check valves. The check valve in one of the inlet ports prevents air from travelling backwards to the booster fan. The other inlet port is connected to a conventional air inlet grille through a flexible metal duct. The discharge side of the air mixing plenum is connected to the conventional air distribution inlet of a car to provide air-conditioning inside the car cabin.

11 Claims, 5 Drawing Sheets

AIR INTAKE DEVICE FOR LAND VEHICLES

BACKGROUND OF THE INVENTION

The present invention relates to an air intake device for improving the quality of air within the passenger compartment of land vehicles, such as automobiles.

The modern city dweller spends about two hours per day in his or her car, plus additional leisure time, vacation time, commuting time. All told, the time a city dweller spends inside of, or in the vicinity of, a car in an urban environment is close to six hours per day or nearly one fourth of a person's lifetime.

In the prior art, the air intake system of land vehicles, such as automobiles, is usually arranged behind the grille at the front end of the car. Air is drawn through the grille and then passed into the passenger compartment. The front grille is typically arranged at the level of the vehicle before the engine so that the air drawn through the grille is obtained from the air flow near the boundary layer of the road. However, it is known that some pollutants in vehicle exhaust plumes tend to settle near the ground. Thus, the air flow near the boundary layer of the road may contain pollutants exhausted from other vehicles on the road, especially in the case of bumper-to-bumper traffic when the exhaust plume of the car immediately in front may be directed into the front grille. In view of the irritating effects these pollutants may cause, it is desirable to avoid inhalation and contact with such pollutants.

One solution to provide cleaner air in the passenger compartment of a vehicle is to drastically reduce the emission of pollutants in the exhaust gases of the vehicles. However, this solution seems highly unlikely at least for the first half of the twenty-first century.

OBJECT AND SUMMARY OF THE INVENTION

It is an object of the air intake device in accordance with the present invention to provide clean air for occupants of the vehicles to breathe inside the vehicles when the vehicles are travelling in congested city streets or highways, especially during rush hour.

In an air intake device in accordance with the present invention, air to be passed into the passenger compartment is not obtained from the area near the front grille of the car or near the boundary layer of the flow as in the case of the prior art. The intake air is directed from an area where the pollutant content is less than that in the vicinity of the car. The air intake device is incorporated into the radio or communications antenna which is modified to pass air therethrough in a volume of about 50 cubic feet per minute.

An inline booster fan should be utilized to overcome the friction losses caused by high velocity flow of air through the intake tubing, and to pressurize the car cabin in which the occupants are seated.

The components of this system are easily available in the commercial market, or could be manufactured without encountering major obstacles.

In one embodiment, a telescopic double wall air intake device is provided which includes an antenna, an air intake canister, or other air intake means, attached to one end and an air plenum arranged on the other end of the antenna. The air canister has disposable filtering material therein. The air plenum is attached to a frame of a car or other vehicle and carries a pneumatic or electric motor for moving the telescopic air intake device up and down. The air plenum may also be connected to a radio and other communication devices. The inlet side of a high static air moving device, e.g., an air booster fan, is connected to the air plenum via a flexible duct. The discharge side of the booster fan is connected to a second air plenum, e.g., an air mixing plenum, via a flexible metal air duct. The air mixing plenum has three connection ports, two of which are used for inlet flows and one of which is for discharge flow. The inlet ports are provided with check valves. The check valve in one of the inlet ports prevents air from travelling backwards to the booster fan. The other inlet port is connected to a conventional air inlet grille through a flexible metal duct. The discharge side of the air mixing plenum is connected to the conventional air distribution inlet of a car to provide air-conditioning inside the car cabin.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
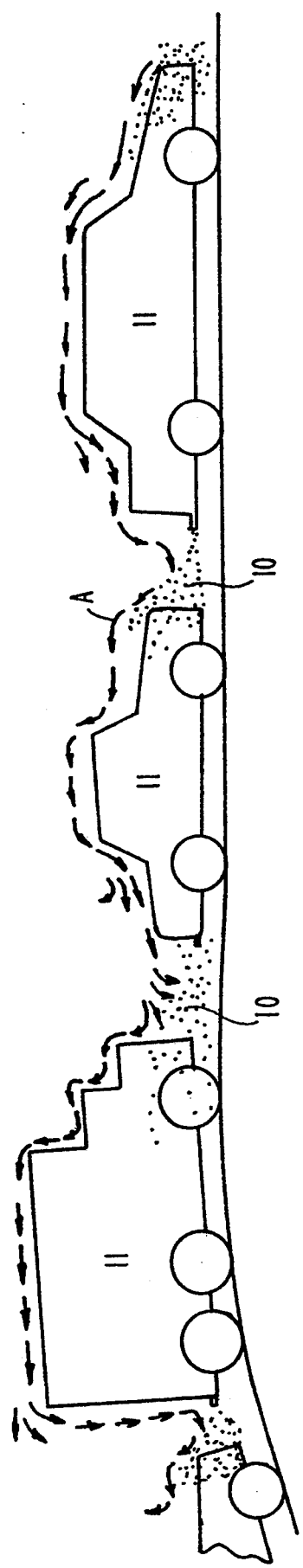
FIG. 1 is an illustration of typical rush-hour congestion of vehicles and the pollution particles-containing exhaust gases.

Referring to the drawings, wherein like reference numerals refer to the same elements, FIG. 1 illustrates vehicles 11 in typical bumper-to-bumper rush hour traffic. The vehicles 11 produce exhaust emission 10 which pollute the air and flow in the direction of arrows A. This polluted air is then drawn into the air intake system of the following vehicle since the air intake system is usually incorporated into the grille in the front of the car so that the air intake is close to the source of the exhaust emissions. This results in a higher percentage of pollutants inside the car cabin.

Figure 2:
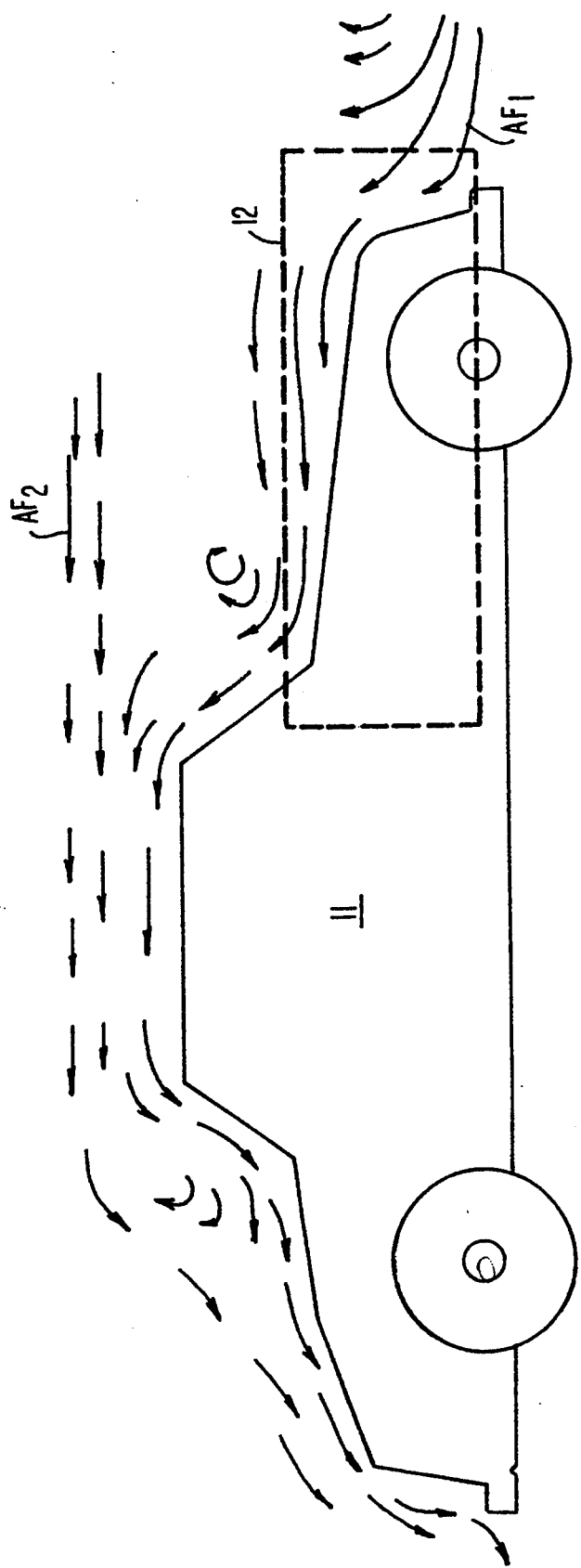
FIG. 2 is an illustration of the air flow pattern around one vehicle.

In FIG. 2, the air flow pattern around a single vehicle 11 is shown. Air flows as an air stream $AF_1$ from the vehicle in front of vehicle 11 (not shown) and contains the exhaust emissions from that vehicle so that air flow $AF_1$ has a higher percentage of exhaust gases than usual. Since the air intake area 12 is located around the front of the car, e.g., by the grille, the pollutant laden air in drawn into the inside of the car. As shown in FIG. 2, a second air stream $AF_2$ flows at a level above the car and does not contain as much exhaust gases and pollutants but rather has a higher percentage of cleaner air.

Figure 3:
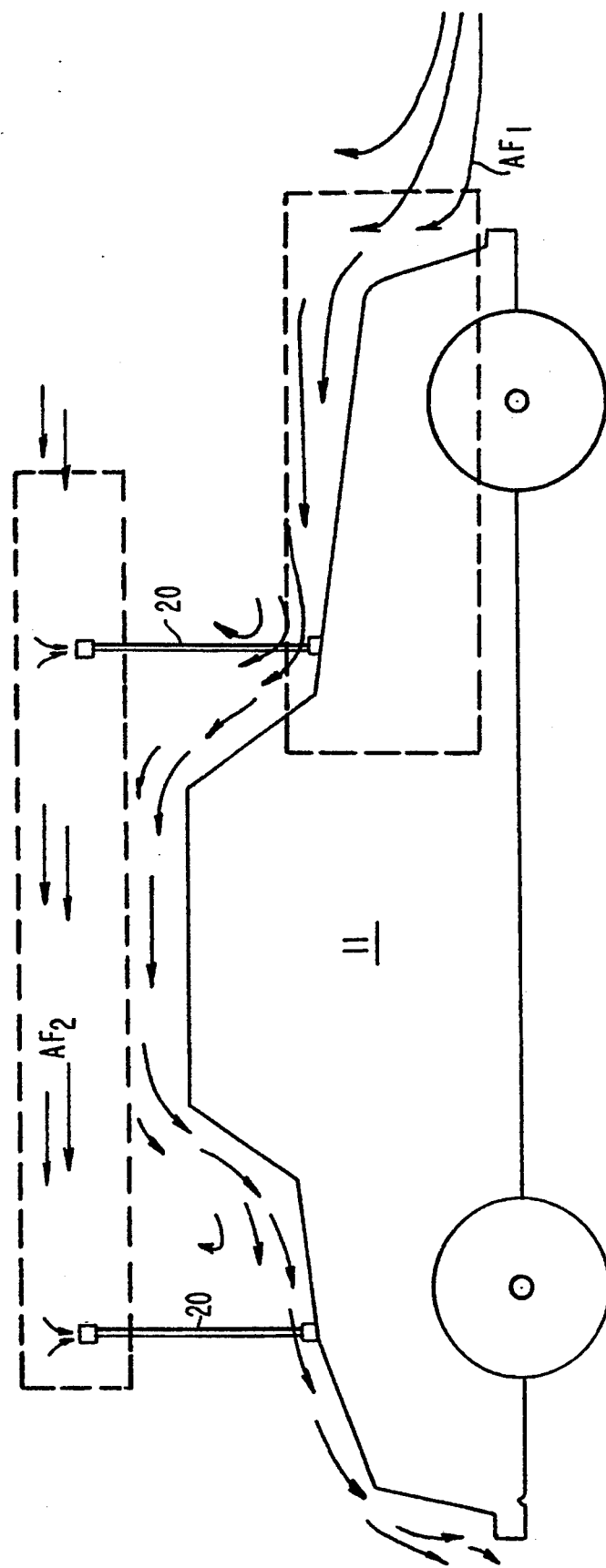
FIG. 3 show alternative locations of the device in accordance with the present invention.

As shown in FIG. 3, an embodiment of the device in accordance with the present invention is denoted generally by 20. The device 20 extends from the surface of the car 11 into the air of cleaner air, e.g., into flow $AF_2$. In this manner, the dirtier air in air flow $AF_1$, is not drawn into the car and the air inside the car will thus have less pollutants from the exhaust emissions of the other cars on the road. The device 20 may be arranged, e.g., at a front end of the car or at a rear end of the car as shown in FIG. 3.

Figure 4:
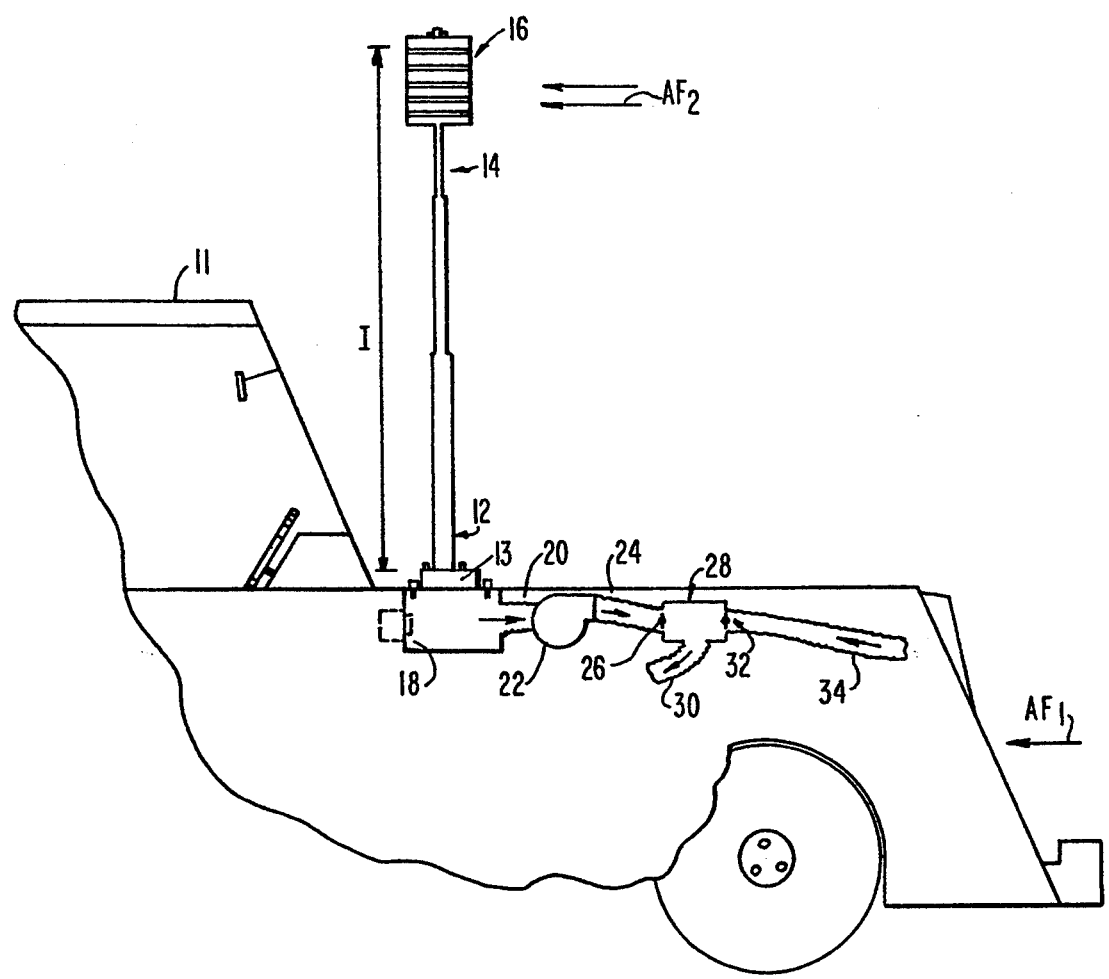
FIG. 4 shows the device in accordance with the present invention in detail.

FIG. 4 shows the elements of another embodiment of the device 12 in accordance with the present invention arranged in a car 11. The device 14 comprises a telescopic air intake tube 14 having an air intake canister 16 arranged at the upper end and an air plenum 18 arranged at the lower end. The telescopic air intake tube 14 is used as the antenna of the car for the radio or other communications device and has a height H which is attained by extending the telescopic antenna via motor drive 13. The air intake canister 16 has disposable filters arranged therein. The air plenum 18 has connections to the radio or other communications device. The motor drive 13 extends and retracts the telescopic tube when desired.

A flexible air duct 20 leads from the air plenum 18 to a high-static air booster fan 22. Another flexible air duct 24 leads from the booster fan 22 through an inlet port having an air check valve 26 to an air mixing plenum 28. Air is also passed through a flexible air duct 34 leading from the air intake grille of the car into the air mixing plenum 28 via another air inlet port having an air check valve 32. Thereafter, the air is mixed in the air mixing plenum 28 and directed through an outlet port to a flexible air duct 30 and then to the air distribution system of the car. The air booster fan 22 delivers about 75 cubic feet of air at 2 to 4 inches of Hg external static pressure.

The end product of the telescopic air intake device (Urban Survival Kit) will be easy and inexpensive to produce, easy to install and will help to clean the air we breathe when seated inside vehicles.

The variations and modifications that can be made and added to this product and pressurizing the car cabin are endless, and result in better and better air quality inside a car.

Figure 5:
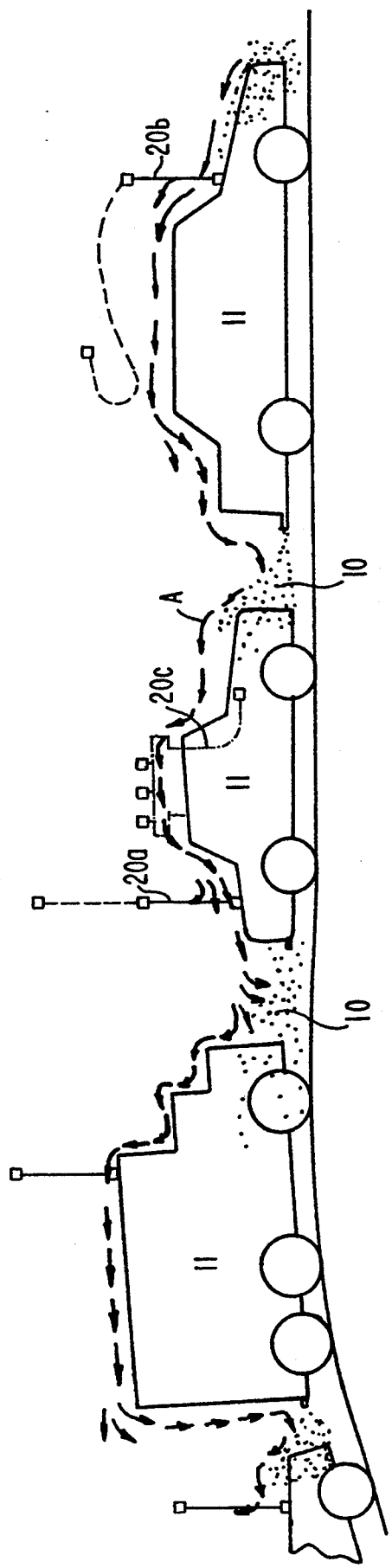
FIG. 5 illustrates additional embodiments of the device in accordance with the present invention.

FIG. 5 shows some different variations and accessories that can be added to the telescopic air intake device in accordance with the present invention. The air intake device 20a is extendable to a desired height, about twice the normal height of the air intake device as shown. Air intake device 20b is arranged to be flexible at least at an upper portion thereof. Air intake device 20c is arranged to be situated within the vehicle or outside of the vehicle depending on its desired position. Additional sensors and controls may also be incorporated into the air intake device in accordance with the present invention.

The examples provided above are not meant to be exclusive. Many other variations of the present invention would be obvious to those skilled in the art, and are contemplated to be within the scope of the appended claims.

I claim:

1. An air intake device for a land vehicle having a closeable passenger compartment, comprising
    an antenna having a first end and a second end opposite to said first end,
    air inlet means arranged on said first end of said antenna, and
    an air plenum box arranged on said second side of said antenna such that air is passed from said air inlet means through said antenna to said air plenum box.

2. The air intake device of claim 1, wherein said air inlet means comprise an air inlet canister having a filter arranged therein.

3. The air intake device of claim 1, further comprising motor drives for extending and retracting said antenna.

4. The air intake device of claim 1, further comprising an air booster fan coupled to said air plenum box.

5. The air intake device of claim 4, wherein said air booster fan delivers about 75 cubic feet of air at 2 to 4 inches of Hg external static pressure.

6. The air intake device of claim 4, further comprising an air mixing plenum comprising three connection ports, said booster fan directing a first air flow through a first one of said ports into said air mixing plenum, a second air flow being directed through a second one of said ports into said air mixing plenum from an air inlet grille of the vehicle, and a flow of air being directed through said third one of said ports to an air distribution system of the vehicle.

7. The air intake device of claim 6, further comprising check valves arranged in said first and second ports.

8. The air intake device of claim 1, wherein said antenna comprises a telescopic double wall tube.

9. A land vehicle having an improved air intake system, comprising
    a vehicle having a closeable passenger compartment,
    an antenna having a first end attached to said vehicle and a second end opposite to said first end, and
    air inlet means arranged on said second end of said antenna, such that air is passed from said air inlet means through said antenna to said passenger compartment.

10. The vehicle of claim 9, wherein said air inlet means comprise an air inlet canister having a filter arranged therein.

11. The vehicle of claim 9, wherein said antenna comprises a telescopic double wall tube, the vehicle further comprising motor drives for extending and retracting said antenna.

* * * * *